United States Patent [19]

Hoffmeister et al.

[11] 4,030,973
[45] June 21, 1977

[54] GRIPPING DEVICE, ESPECIALLY FOR USE IN MANIPULATING CONTROL BARS IN A NUCLEAR REACTOR

[75] Inventors: Bernhard Hoffmeister, Wilhelmshaven; Gerhard Dose, Laudenbach, Bergstrasse, both of Germany

[73] Assignee: Fried. Krupp Gesellschaft mit beschrankter Haftung, Essen, Germany

[22] Filed: July 2, 1974

[21] Appl. No.: 485,264

[52] U.S. Cl. .................. 176/36 R; 176/30
[51] Int. Cl.² ........................... G21C 7/08
[58] Field of Search ............. 176/30, 31, 32, 33, 176/34, 35, 36, 87; 294/86 A

[56] References Cited

UNITED STATES PATENTS

| | | | |
|---|---|---|---|
| 3,377,252 | 9/1968 | Knights | 176/36 R |
| 3,691,011 | 9/1972 | Kruger et al. | 176/30 |
| 3,713,971 | 1/1973 | Van Santen et al. | 176/30 |
| 3,733,250 | 5/1973 | Van Santen et al. | 176/30 |
| 3,768,668 | 10/1973 | Schukei | 176/30 |
| 3,856,621 | 11/1974 | Suvanto et al. | 176/30 |
| 3,863,770 | 2/1975 | Shallenberger et al. | 176/30 |
| 3,904,048 | 9/1975 | Van Santen et al. | 176/30 |

*Primary Examiner*—Samuel W. Engle
*Assistant Examiner*—S. A. Cangialosi
*Attorney, Agent, or Firm*—Walter Becker

[57] ABSTRACT

A device for gripping bundles of control bars or rods for extracting the control bars from and introducing the control bars into fuel cells of nuclear reactors in which the control bars are in bundles connected by a spider-like head at the top and the gripping device includes a plate with a perforation through which the head can pass. When the head is released from the fuel cell and lifted upwardly through the plate, the plate provides lateral guidance for the control rods thereby facilitating replacement of the control rods into a fuel cell. The gripping device includes a reciprocable gripper body in a gripper tool detachably connectable thereto and to said head and guided on said plate by guide members projecting from the plate.

8 Claims, 12 Drawing Figures

GRIPPING DEVICE, ESPECIALLY FOR USE IN MANIPULATING CONTROL BARS IN A NUCLEAR REACTOR

The present invention relates to a gripping device with a gripping body which is suspended on a lifting device and is adapted to grasp bar heads each of which is able to hold together a bundle of long thin bars at the upper ends thereof, said bars to be moved into narrow spaces, in such a way that a coherent diamond-shaped overall profile of the bars or rods is formed with the profile of the bars protruding beyond the profile of the bar head.

In this connection there exists the problem that it is difficult to introduce the long thin bars into the narrow spaces. This is true in particular for control bars or rods, turn-off bars or the like in core reactors. Such bars have for instance a length of from 3 to 4 meters and have a diameter of from only 1 to 2 centimeters. When bars of this type arranged in a bundle are thermally unevenly loaded, there exists the danger that they curve to a different degree and consequently cannot be introduced into the narrow position bores in the respective mountings of fuel element heads. In addition thereto, due to the operating and lowering movements the bars are easily subjected to oscillations.

It is, therefore, an object of the present invention to provide a gripping device of the above mentioned general type which will overcome the above outline drawbacks.

The gripping device according to the present invention is characterized primarily in that for purposes of laterally supporting the lower ends of the bars holding means are provided which have mounted thereon a mask with a perforation into which fits the total profile and which is provided with guiding surfaces of all bars, said holding means being guided relative to the gripping body so as to be movable parallel to the axis thereof and being adapted in various positions of height relative to said gripping body to be connected to the latter by followers.

The invention is of particular importance when one and the same gripping device may selectively operate with different gripping tools one of which for instance serves for grasping bar heads while another gripping tool serves for grasping fuel element heads. In such an instance, the holding means referred to in the preceding paragraph are slideably guided by guiding means mounted on the bar gripping tool.

The present invention results above all with core reactors in a considerable advance in the art inasmuch as the exchange of the control bars, shut-off bars, etc., can be effected reliably, especially when a gripping device is involved with two gripping tools which are to be coupled alternately to the gripping body and one of which serves for grasping bar heads while the other one serves for grasping fuel element heads.

The invention is illustrated by way of example in the accompanying drawings, in which:

FIGS. 1, 2, 6, 9 and 10 respectively illustrate a gripping device partially with a bar head and pertaining control bars, partially in side view and partially in axial sections in different positions.

Figure 4:
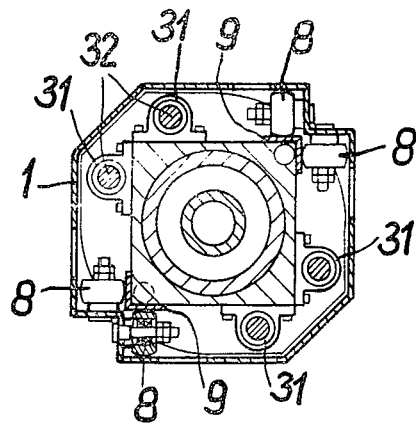
FIG. 4 is a section taken along the line IV—IV of FIG. 2.
Figure 8:
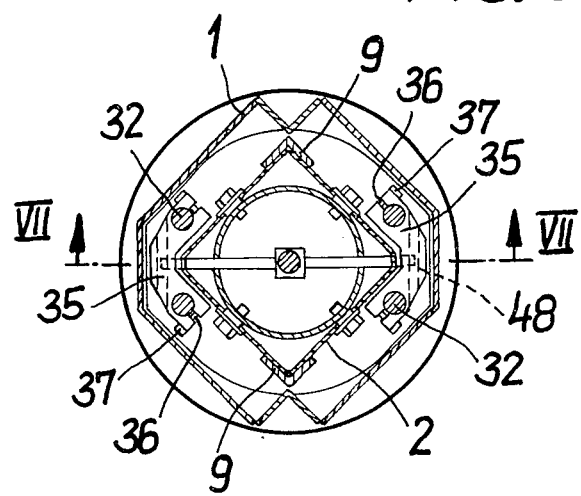
FIG. 8 is a section taken along the line VIII—VIII of FIG. 7.

Referring now to the drawings in detail, a guiding post 1 extends downwardly from the frame of a charging device which frame is movable above a tank or basin containing the core of a reactor and above a storage basin or tank for fuel elements. As will be evident from FIGS. 4 and 8, the guiding post 1 is designed as a sheet metal box of a square profile with slanted and angled corners. Within the guiding post 1, the gripping body is guided so as to be adapted to be lifted and lowered, said gripping body comprising an upper longer section 2 and a lower shorter section 3. Both sections are hollow bodies of square shaped cross section. The upper section 2 is by means of non-illustrated cables suspended on a lifting mechanism which is mounted on the frame of the charging device. The lower section 3 is telescopically slideably guided in the lower end of the upper section 2. The movement of the lower section 3 relative to the upper section 2 in upward direction is limited by the fact that the upper rim of the section 3 (FIG. 2) abuts a shoulder of the upper section 2. The movement of the lower section 3 relative to the upper section 2 is limited by the fact that rollers 4 which are rotatably journaled on the lower section 3 at opposite sides with regard to each other engage limited slots 5 of the upper section 2. A helical pressure string 6 has its upper end rest against the above mentioned shoulder of the upper section 2 and has its lower end rest against the bottom 7 of the lower section 3.

The sections 2 and 3 of the gripper body are within the guiding posts 1 guided centrally to the latter by the fact that in corners of the guiding post which are located diagonally opposite each other, at different heights there are respectively arranged two pairs of guiding rollers 8 with the axes of rotation thereof arranged at a right angle with regard to each other, said rollers engaging angle rails 9 respectively embracing an edge of the sections 2 and 3.

The gripping bodies 2, 3 include two gripping tools one of which (not illustrated) serves for grasping fuel element heads. The other gripping tool which forms the bar gripping tool 10 serves for grasping the bar bodies. Both gripping tools have the same outer configuration and the same outer dimensions. The cross section of said two gripping tools is square shaped with the same side length as the cross section of the upper section 2 of the gripping body.

The bar gripping tool 10 has a wide bore 12 (FIG. 11) which is open at the top so that a flange 13 extending in upward direction is formed. Bore 12 widens at the upper rim of the flange 13 with a conical surface 14. The flange or collar has its inner side approximately at half its height provided with an annular groove 15.

For purposes of coupling the tool 10 to the lower section 3 of the gripping body there is provided a cylindrical collar 16 which extends downwardly from the bottom 7 of the lower section 3 and can be lifted into the bore 12 until a collar 17 of the section 3 rests on the collar 13. As will be evident from FIG. 11, in such an instance a conical surface of the collar 16 engages the conical surface 14 of the collar 13.

When coupling the tool 10 to the section 3 of the gripping body it must be assured that it will occupy a definite rotary position relative to the section 3 with regard to the common vertical axis. This will be realized by means of a pin 18 (FIG. 11) which protrudes from a radial bore of the collar 16 and fittingly engages a slot 19 of the collar 13, said slot being open at the top.

In radial bores of the collar 16 there are located balls 20 the diameter of which approximately equals the inner diameter of the radial bores and is slightly greater than the thickness of the collar 16. When the collar 16 has been completely inserted into the bore 12, the balls 20 will then be located precisely opposite the annular groove 15. According to FIGS. 6 and 11, the balls 20 have entered the annular groove 15 and are prevented from leaving said groove by a pot-shaped slide 21 which within the collar 16 is movable upwardly and downwardly while being guided by said collar 16. The slide 21 is by means of a bar 22 connected to the piston of an air operable power device the cylinder 23 of which is arranged on the bottom 7. The non-illustrated spring continuously urges the piston downwardly in order to move the slide 21 into the lower position according to FIGS. 6 and 11, in which position the bar gripping tool 10 is by means of the balls 20 coupled to the lower section 3 of the gripping body. For purposes of disconnecting this connection, the slide 21 is moved upwardly by compressed air which is conveyed into the cylinder 23 below the piston and overcomes the thrust of the above mentioned spring.

Each of the four sides of the bar gripping tool 10 is provided with a downwardly extending fork-shaped finger 24. As will be evident from FIGS. 9 and 11, the inner sides of said fingers 24 may be guided on fingers 25 which extend upwardly from a fuel head 26. The pertaining non-illustrated fuel element is inserted into a vertical bore of the reactor core or of a bearing frame. The fingers 25 may fittingly engage recesses in fingers 24 while the upper rim 27 (FIG. 11) of this recess may rest on the upper tapered rim of the fingers 25.

Figure 12:
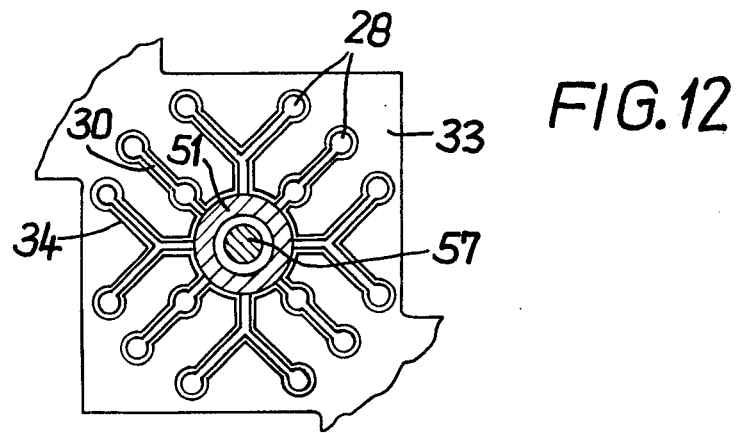
FIG. 12 represents a section taken along the line XII—XII of FIG. 11.

Control rods or bars 28 or other bars necessary for the reactor operation are from above inserted into vertical bores of the above mentioned fuel elements. The upper ends of said bars or rods which protrude from the fuel element head 26 are held together by a bar head 29 in such an arrangement that they form a diamond shaped pattern according to FIG. 12. The bar head 29 comprises a cylindrical sleeve and narrow arms 30 which protrude from the sleeve at the same height as the sleeve in a diamond shaped manner and partially have branches.

Guiding bushings 31 which are arranged in pairs and in spaced relationship one above the other are located on the bar gripping tool 10 on both sides of those diagonally oppositely located edges which are free from angle rails 9. In these guiding bushings 31, two pairs of guiding bars 32 are slideably guided parallel to the axis of the bar gripping tool. The guiding bushings 31 are designed as so-called ball bushings within which balls are provided for an easy guiding of the guiding bars. The lower ends of the guiding bars 32 are firmly located in a plate 33 which forms the above mentioned mask. This mask has a perforation 34 which is so adapted to the profile of the bar head 29 with the control bars 28 that the mask 33 can be moved over the bar head 29 from the top downwardly. The control bars 28 have only a slight play relative to the perforations 34, whereas the arms of the control head have a greater play relative to the perforation 34.

Two guiding bars 32 are at the respective elevations by respective locking means 35 firmly connected to each other. As will be evident from FIG. 8, these locking means have an annular contour so that they are able to embrace the edges of the gripping body 2, 3. Each locking means 35 is at both ends provided with slots 36 which extend up to the bores receiving the guiding bars 32. The slotted ends of the locking means 35 may be pulled together by means of screws 37 so that the locking means themselves can be braced with the guiding bars 32. The upper ends of the guiding bars are slanted.

As followers for lifting the guiding bars, there are at a certain height of the upper section 2 of the gripping body, two pawls 38 with their upper ends threadable suspended on a piston rod 39 the piston of which is guided in the cylinder 40 which is arranged on a bottom 41 of the gripper body-section 2.

The piston rod 39 protrudes from the top of the cylinder 40 and is subjected to the downwardly directed pressure of a helical spring 42 which in a mounting 43 of the cylinder 40 rests against an upper bearing 44. Compressed air may be introduced into the cylinder 40 below the piston.

The lower ends 45 of the pawls 38 rest on an intermediate bottom 46 of the upper gripper body-section 2 and form hooks which are open toward the top. The pawls 38 have a common vertical central plane which extends diagonally to the square shaped cross section of the upper gripper body-section 2. This upper gripper body-section 2 has slots 47 through which the pawls 38 can pass. The bottom sides of the locking means 35 are provided with grooves 48 adapted to be engaged by the hook shaped ends 45 of the pawls 38.

It may be assumed that the bar gripping tool 10 is to be coupled to the gripping body 2, 3. This tool is in position of readiness in a storage frame while resting with its fingers 24 (FIG. 1) on the bottom of a box 49 which is open at the top. The mask 33 rests on the bottom of this box. The guiding bars 32 protrude far beyond the gripping tool 10 in upward direction.

Figure 1:
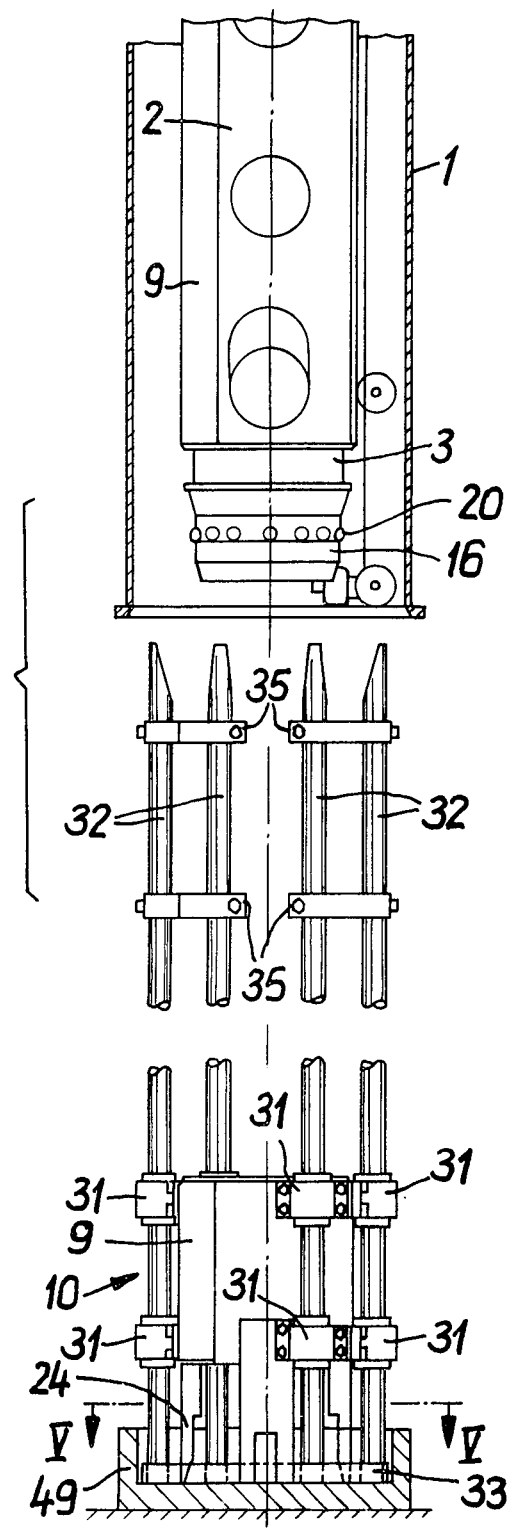

FIG. 1 furthermore shows the gripping body 2, 3 which together with the gripping post 1 is lowered centrally with regard to the bar gripping tool 10. The balls 20 protrude from the radial bores of the cylindrical collar 16 of the lower section 3. The slide 21 is moved downwardly in the manner illustrated in FIG. 11. A non-illustrated blocking device prevents the slide from being moved upwardly by compresed air introduced into the cylinder 23.

Figure 5:
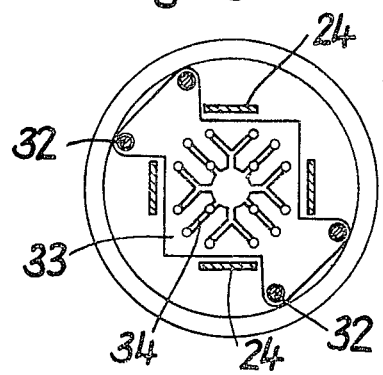
FIG. 5 represents a section taken along the line V—V of FIG. 2.

During the downward movement of the gripping body, the lower part 3 is moved out downwardly from the upper section 2 to such an extent as the rollers 4 in carriage 5 will permit. Compressed air is introduced into the cylinder 40 which compressed air moves the piston rod 39 upwardly against the thrust of the spring 42 into the position shown in FIGS. 5 and 9. Consequently, the ends 45 of the pawls 38 are pulled into the interior of the gripper body-section 2. Therefore, as will be evident from FIG. 3 they do not abut the latches or locks 35 when the gripper body is lowered.

Figure 2:
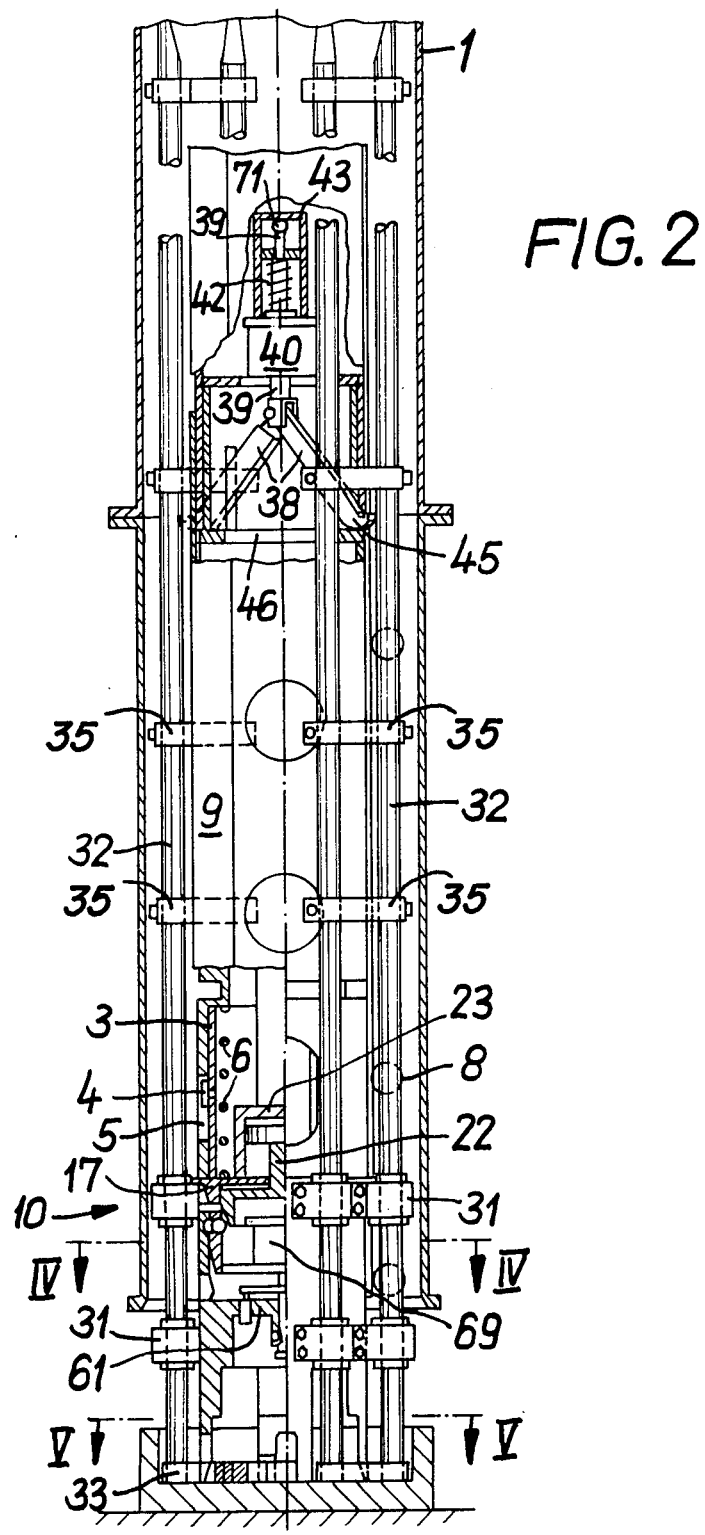

In view of the lowering of the gripping body, first the balls 20 protruding beyond the collar 16 are deposited upon the conical surface 14 of the collar 13 of the gripping tool 10. Consequently the lower section 3 of the gripping body no longer takes part on the lowering movement of the upper section 2. As the result thereof, the mentioned blocking device is made ineffective. Therefore, the slide 21 may now by means of compressed air introduced into cylinder 23 be moved upwardly so that the slide will release or free the balls 20 as shown in FIG. 2. The balls 20 are therefore due to the weight of the lower gripper body section 3 and with the aid of the spring 6 rolled on the conical surface 14 and pressed into the radial bores. The pin 18 threads so to speak itself into the slot 19 of the collar 13 so that the correct position of rotation of the gripper body relative to the bar gripping tool 10 will be assured. Finally, the flange 17 is deposited on the collar 13 whereby the balls 20 occupy a position opposite the ring groove 15 as shown in FIG. 2.

Figure 6:
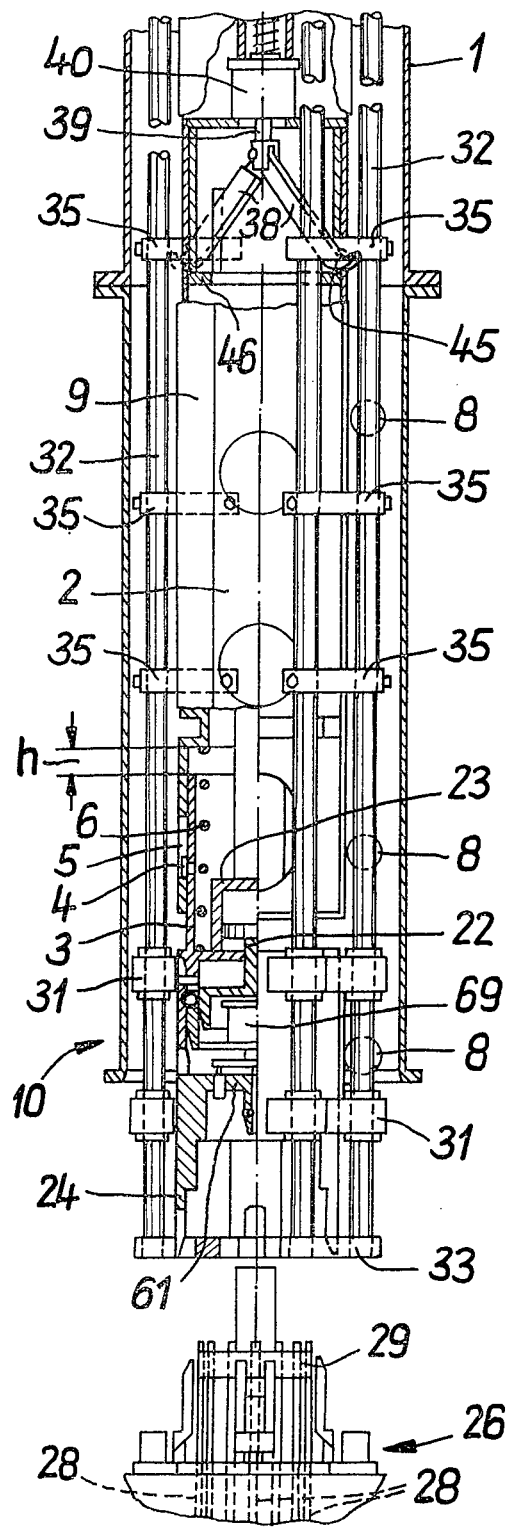

After the compressed air withdrawn from below the piston within the cylinder 23, the slide 21 is by the abovementioned (non-illustrated) spring moved downwardly into the position shown in FIGS. 6 and 11. As a result thereof, the balls 20 are moved into the ring-groove 15 and are prevented from leaving same.

Figure 3:
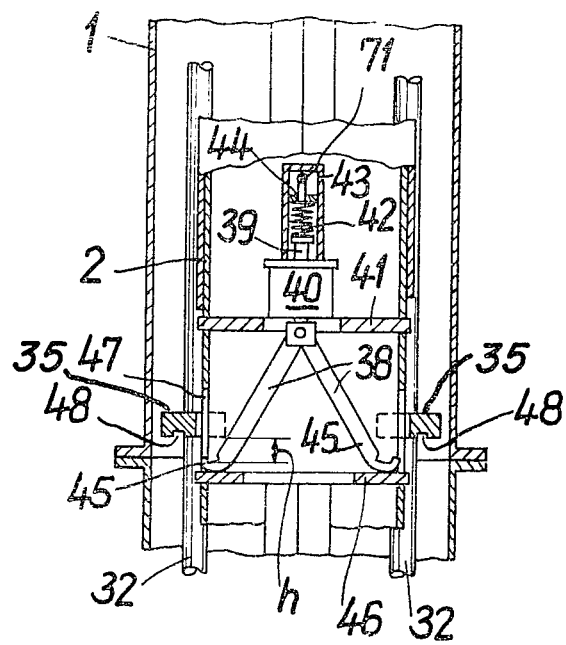
FIG. 3 shows the upper portion of the gripping device in a position according to that of FIG. 2 in an axial section diagonally with regard to the gripping body.

During the just described operation, the upper section 2 of the gripper body has moved downwardly against the thrust of spring 19 to such an extent that the upper edge of the section 3 engages a shoulder surface of the upper section 2. In this connection, the section 2 has relative to the lower section 3 carried out a stroke h (FIG. 3). The lower ends 45 of the pawls 38 are, as shown in FIG. 3, arranged lower by the distance h than the nearest latch 35.

Thereupon the compressed air is withdrawn from the cylinder 40 so that the spring 42 moves the piston rod 39 downwardly so that the pawls 38 move into the spreading position shown in FIG. 2. The lower ends 45 of said pawls 38 pass through slots 47 toward the outside so as to catch below the latches 35. If now the upper section 2 of the gripper body is lifted, the hook shaped lower ends 45 of the pawls 38 move into the grooves 48 of the latches 35 so that the guiding bars 32 and thus the mask 33 are likewise lifted. The upper section 2 of the gripper body has been lifted by the distance h relative to the lower section 3 so that through the intervention of the rollers 4 in the slots 5, the lower section 3 is likewise lifted upwardly. FIG. 6 shows the gripping device in this condition.

Figure 9:
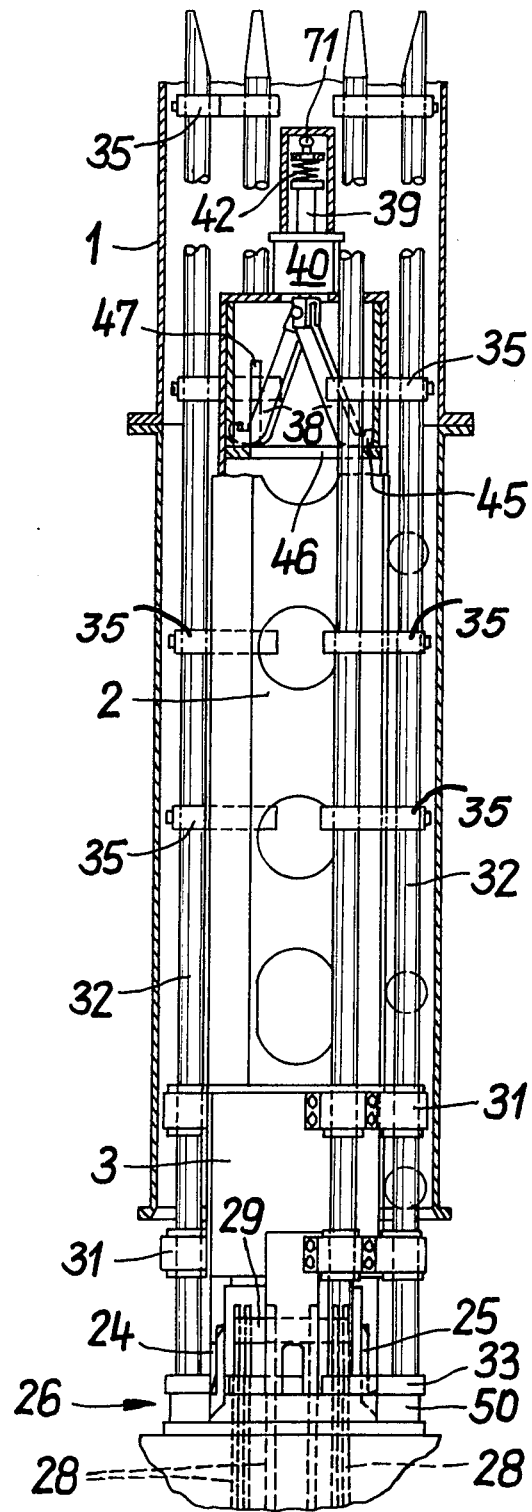

It is now assumed that by means of the gripping device, a bundle of control bars is to be pulled out from the fuel element the head of which is designated with the reference numeral 26. To this end, the gripping body 23 is floatingly lowered above the bar head 29. In this connection the gripping body is so aligned that the perforation 34 is fittingly suspended above the bar head 29. During a further lowering of the gripping body, the bar head 29 passes through the perforation or passage 34, and the mask 33 is placed on a support 50 on the fuel element head 26 in such a way that the bottom side of said mask is approximately flush with the lower surfaces of the fingers 24. This condition is shown in FIGS. 9 and 11.

As next step, the bar gripping tool 10 is coupled to the bar head 29 and the latter is disengaged from the fuel element head 26. This is effected by means of the following structural elements.

Figure 11:
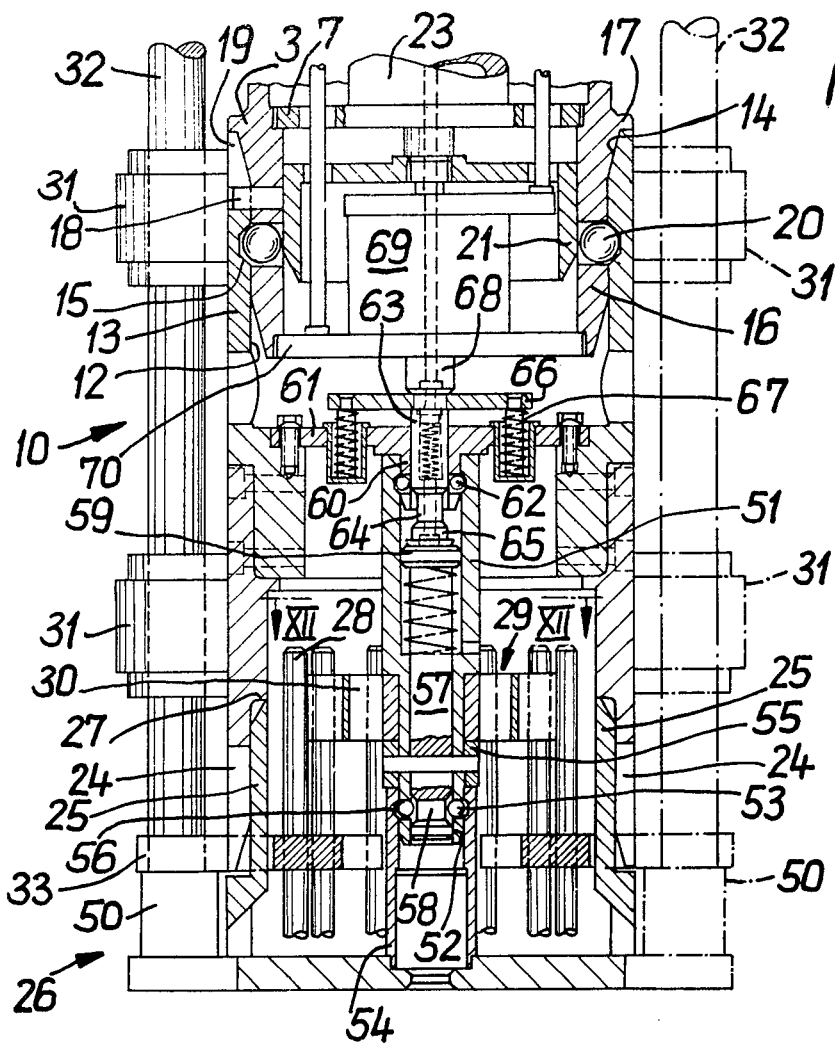
FIG. 11 illustrates in axial section the lower portion of the gripping device with the latter occupying its FIG. 9 position, but on a larger scale than that of FIG. 9.

As will be seen from FIG. 11, a sleeve 51 is inserted into the bar head 29 centrally therewith. This sleeve is continued below the bar head 29 as a cylindrical collar 52 provided with radial bores with pawls 53. The collar 52 fittingly engages a bore of the sleeve 54 which extends upwardly from the fuel element head 26 and upon which rests a ring 55 surrounding the sleeve 51.

The sleeve 54 has a ring-groove 56 into which the balls 53 are able to enter. A control bar 57 is movable to a limited extent in upward and downward direction in a bore of sleeve 51. In the illustrated lowermost position, a ring-groove 58 of the control bar is located opposite the balls 53. In the upper portion of sleeve 51, the control bar 57 is by means of a piston 59 slideably guided in a bore. In conformity with the position shown in FIG. 11, a collar 60 extends into said bore. The collar 60 extends from an intermediate bottom or partition 61 of the bar gripping tool 10 in downward direction. Balls 62 located in bores of the collar 60 extend into a ring-groove of the sleeve 51. The balls are prevented by a bolt 63 from leaving said ring-groove, said bolt 63 being slidably guided in a vertical bore of the collar 60. The lower end of the bolt 63 which lower end with the position shown in FIG. 11 is adjacent to the ball 62, has an annular groove 64 followed by a collar 65 engaging the top side of the piston 59. The bolt 63 is mounted on a yoke 66 which is urged upwardly by pressure springs 67. A punch 68 forming the continuation of a piston rod rests against the yoke 66. The pertaining piston is guided in a cylinder 69 which is mounted on a plate 70 closing the lower part of the gripper body section 3. A non-illustrated spring has the tendency to move the piston and thus the pump 68 downwardly. By compressed air which is introduced into the lower portion of the cylinder 69, the punch 68 can be moved upwardly against the thrust of the just mentioned spring.

FIG. 11 shows that the punch 68, after the compressed air has been withdrawn from the cylinder 69 has been moved downwardly by said spring. Accordingly the control bar 57 has been moved downwardly into the illustrated position so that the balls 53 enter the annular groove 58 which means that the bar head 29 is disengaged from the fuel element head 26. Simultaneously, the bolt 63 prevents the balls 62 from leaving the annular groove of sleeve 51. Accordingly, the bar head 29 is coupled to the bar gripping tool 10.

When the bar gripping tool 10 from the FIG. 11 position is placed upon the fuel element head 26 the upper section 2 of the gripping body moves relative to the lower section 3 downwardly by the distance h. In this movement also the lower ends 45 of the pawls 38 take part so that their hook shaped noses leave the grooves 48 of the latches 35. Consequently these noses no longer prevent the pawls 38 from being pivoted into the FIG. 3 position which pivot movement is effected by means of compressed air introduced into cylinder 40 and acting against the thrust of spring 42.

By means of the lifting mechanism, now the upper section 2 of the gripping body is lifted, and after said section 2 has moved relative to the lower gripping body 3 by the distance h, the lower section 3 takes part in the lifting movement. Consequently, the control bars 28 are by means of the bar gripping tool coupled to the section 3 pulled out of the fuel element.

First the guiding bars 32 and the mask 33 do not take part in the lifting movement of the gripping body 2, 3, because the pawls 38 move past said latches 35 in the pulled-in position shown in FIGS. 3 and 9. Consequently the control bars 28 are pulled through the perforation 34 of mask 33.

Figure 7:
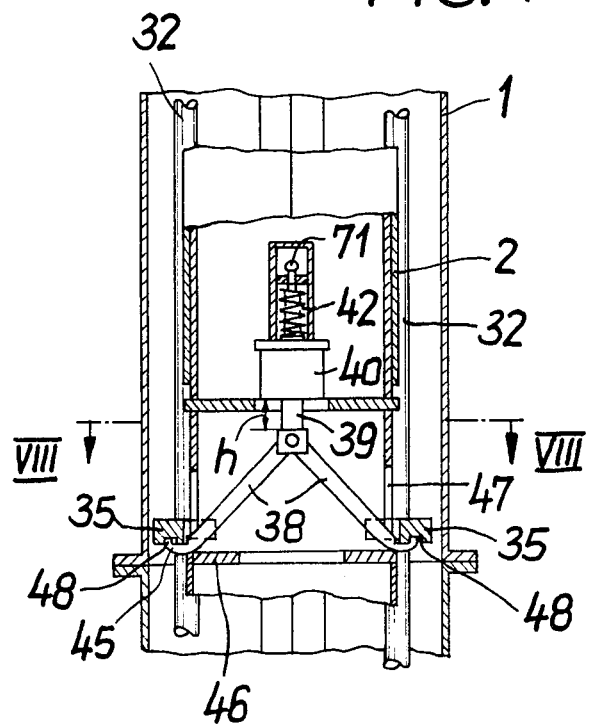
FIG. 7 illustrates similar to the section of FIG. 3 the upper portion of the gripping body while occupying a position according to FIG. 6, the section of FIG. 7 being taken along the line VII—VII of FIG. 8.
Figure 10:
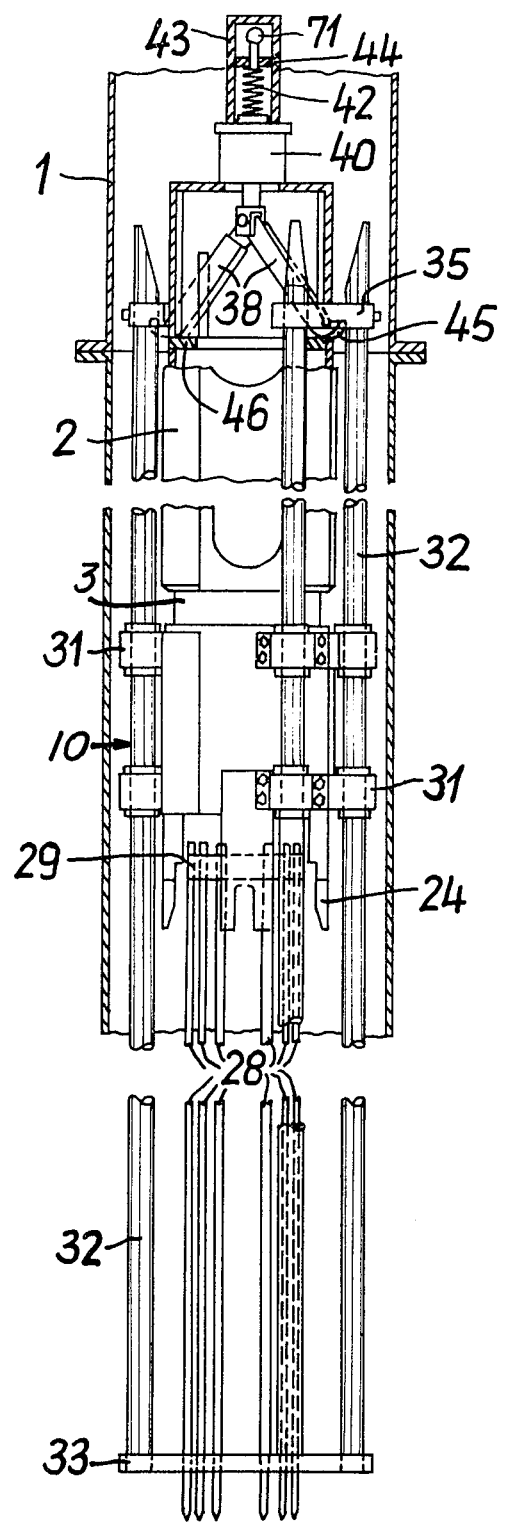

When the lifting movement of the control bars 28 has progressed to such an extent that their lower ends, as shown in FIG. 10, only slightly extend downwardly from the mask 33, the pawls 38 are spread into the position shown in FIGS. 7 and 10 so that their lower ends 45 catch below those latches 35 which are nearest when looking in upward direction. Consequently, the noses of the hook shaped ends enter from below into the grooves 48 of the latches 35. Consequently the control bars 32 are in response to a further lifting of the gripping body 2, 3 taken along so that the mask 33 remains in its FIG. 10 position closely above the lower ends of the control bars 28. Therefore, the control bars are held at a proper distance relative to each other so that the introduction of the control bars into the respective bores of a holding means or a fuel element will not cause any difficulties. This is effected by the fact that the gripping body is lowered precisely aligned about the fuel element head 26 or above the respective holding means. In this connection, first the mask 33 is deposited upon the support 50 so that the guiding bars 32 will not take part in a further downward movement of the gripping body. Consequently, the noses of the hook shaped ends 45 of the pawls 38 move out of the grooves 48 of the latches 35 remaining stationary, during the further downward movement of the gripping body 2, 3. Therefore, the noses no longer prevent the movement of the pawls 38 to the relative position according to FIG. 3 so that the pawls 38 will during the further downward movement of the gripping body 2, 3 not collide with the further downwardly arranged latches 35 of the stationary guiding bars 32.

During the continuation of the lowering of the gripping body 2, 3 the control bars 28 are passed through the perforation 34 of the mask 33 until eventually the bar head 29 in the manner shown in FIG. 11, together with the ring 55 is placed upon the sleeve 54 which extends upwardly from the fuel element head 26.

Inasmuch as thus the bar gripping tool and the lower section 3 of the gripping body cannot move further downward, the upper section 2 moves downwardly by the additional distance h. Consequently, the blocking device is disengaged which up to that point has prevented the cylinder 69 from being acted upon by compressed air from below. This is effected in such a way that the punch 68 and thus bolt 63 as well as control bar 57 are moved upwardly against the thrust of the pertaining spring. Consequently, on one hand the lowermost end of the control bar 57 moves behind the balls 53 and presses the same into the annular groove 56 so that the bar head 29 will be coupled to the fuel element head 26. On the other hand, the annular groove 64 moves behind the balls 62 so that said balls 62 during the subsequent lifting of the gripping body and of the bar gripping tool leave the annular groove of sleeve 51 with the result that the bar gripping tool 10 is disengaged from the bar head 29.

The respective position of the pawls 38 is ascertained by a limit feeler 71 and by remote transfer of pulses at an operator's stand. The spring 6 (FIGS. 2 and 6) brings about a cushioning of the shocks during the placing of the gripping body upon the gripping tool 10 and also during the placing of the gripping body upon the gripping tool 10 and also during the placing of the bar gripping tool 10 upon the fuel element head 26.

It is, of course, to be understood that the present invention is, by no means, limited to the specific showing in the drawings but also comprises any modifications within the scope of the appended claims.

What is claimed is:

1.
   a. A device in combination for gripping alternatively elongated control rods, or fuel elements;
   b. a gripper body which is guided within a guiding post for movement in vertical direction;
   c. a rod head gripping tool which — interchangeable for a fuel element gripping tool — is detachably connected to the lowr end of said same gripper body;
   d. said rod head gripping tool being provided at its lower end with a clutch device for detachably connecting this rod head gripping tool and a head bar to which the upper ends of said elongated rods of a bundle are fastened therewith;
   e. a plate positioned below said clutch device and having a perforation through which said head bar and the rods connected thereto can pass with small clearance around the rods; said plate radially confining said rods when in surrounding relation thereto;
   f. a plurality of separate straight guide members fastened each with one lower end to said plate and extending upwardly therefrom in parallel spaced relationship in such arrangement that said guide members define a space within which said gripper body and said rod head gripping tool can be moved in vertical direction;
   g. guiding means seated on said rod head gripping tool slidably engage said guide members;
   h. at least two independently operable catch means spaced along the longitudinal axis of and connected to said guide members near the upper ends thereof; the difference of said spacing corresponding to the possible difference of length of said elongated rods;
   i. and latch elements supported by said gripper body which can be adjusted into a first position in which said latch elements reach under said catch means and into a second position in which they freely pass said catch means; and means within said gripper body for selectively operating said latch elements, said means controlling the engagement of said gripper tool to said gripper body.

2. A device in combination according to claim 1, in which said catch means are connectors each of which interconnecting a pair of adjacent guide members and being adjustable along these guide members.

3. A device in combination according to claim 2, in which said latch elements are a pair of hooks swingably mounted on said gripper body to swing between said first and said second position.

4. A device in combination according to claim 3, in which each of said hooks has an upstanding finger engageable with a downwardly opening notch in the underneath side of the respective connector.

5. A device in combination according to claim 3, in which said pair of hooks has a common actuator including spring means biasing said hooks into said first position and a power operable means adapted to overcome said spring means and move said hooks into said second position.

6. A device in combination according to claim 2, in which the gripper body and the rod head gripping tool have a square profile two corners of which being located diagonally opposite each other and each being directed to one pair of adjacent guide members interconnected by connectors while the other two corners are engaged with guiding means arranged within said post.

7. A device in combination according to claim 1, in which said rod head gripping tool includes fingers depending therefrom operable to embrace said plate in a lower position of said tool along said guide members.

8. A device in combination according to claim 1, in which said gripper body comprises upper and lower portions having limited freedom of relative axial movement and being spring biased in the separating direction.

* * * * *

UNITED STATES PATENT OFFICE
CERTIFICATE OF CORRECTION

Patent No. 4030973          Dated June 21, 1977

Inventor(s) Bernhard Hoffmeister and Gerhard Dose

It is certified that error appears in the above-identified patent and that said Letters Patent are hereby corrected as shown below:

On the title page, the following should be added:

[30] Foreign Application Priority Data

September 1, 1973, Federal Republic of Germany....2344266

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*